US006699045B2

(12) United States Patent
Christianson et al.

(10) Patent No.: US 6,699,045 B2
(45) Date of Patent: Mar. 2, 2004

(54) INFANT SIMULATION DEVICE AND METHOD THEREFORE

(75) Inventors: Daniel C. Christianson, Jefferson, WI (US); Judith M. Johnson, Deerfield, WI (US); Roger E. Lidicker, Fort Atkinson, WI (US)

(73) Assignee: The Aristotle Corporation, Fort Atkinson, WI (US)

( * ) Notice: Subject to any disclaimer, the term of this patent is extended or adjusted under 35 U.S.C. 154(b) by 0 days.

(21) Appl. No.: 09/950,148

(22) Filed: Sep. 10, 2001

(65) Prior Publication Data

US 2002/0022212 A1 Feb. 21, 2002

Related U.S. Application Data

(63) Continuation of application No. 09/468,492, filed on Dec. 20, 1999, now abandoned, which is a continuation of application No. 08/879,346, filed on Jun. 20, 1997, now Pat. No. 6,050,826.

(51) Int. Cl.⁷ .............................................. G09B 23/28
(52) U.S. Cl. .................... 434/262; 446/297; 434/238
(58) Field of Search ................................ 434/238, 247, 434/265, 395, 308, 262, 118, 269, 297, 396, 307 R, 365; 446/268, 301–305, 295, 297, 299, 484

(56) References Cited

U.S. PATENT DOCUMENTS 2,781,611 A    2/1957   Bills et al.
2,818,678 A    1/1958   Lemelson
3,136,089 A    6/1964   Gardel et al.
3,234,687 A    2/1966   Elwell
3,514,899 A    6/1970   Bonanno et al.

(List continued on next page.)

FOREIGN PATENT DOCUMENTS

EP    0032843      7/1981
EP    0549840      7/1993
GB    2196545      5/1988
WO    WO 98/59331  12/1998

OTHER PUBLICATIONS

"Baby Think It Over" 1997 Catalog, Baby Think It Over, Inc., 1519 Peterson Avenue, Eau Claire, WI 54703.

Baby Think It Over Operating Instructions, 1995, pp. 1–12.

Primary Examiner—Joe H. Cheng
(74) Attorney, Agent, or Firm—Boyle, Fredrickson, Newholm, Stein & Gratz, S.C.

(57) ABSTRACT

A device and method is provided for simulating the activities of an infant. The invention includes a mannequin having a simulator position therein for generating a plurality of simulated activities by the mannequin at preprogrammed timed intervals. Simulated duties such as diaper change, feeding and burping, and attention are generated by the simulator. A user must respond by inserting a proper response element into the simulator in order to terminate the simulated activity. Indicators are provided to inform of the user's abuse or tampering with the simulator.

14 Claims, 7 Drawing Sheets

U.S. PATENT DOCUMENTS

| | | |
|---|---|---|
| 3,641,703 A | 2/1972 | Tepper et al. |
| 3,755,960 A | 9/1973 | Tepper et al. |
| 3,758,983 A | 9/1973 | Cagen |
| 3,918,199 A | 11/1975 | De Masi |
| 4,075,782 A | 2/1978 | Neuschatz |
| 4,160,338 A | 7/1979 | Lyons et al. |
| 4,231,184 A | 11/1980 | Corris et al. |
| 4,249,338 A | 2/1981 | Wexler |
| 4,257,188 A | 3/1981 | Barker |
| 4,267,551 A | 5/1981 | Dankman et al. |
| 4,318,245 A | 3/1982 | Stowell et al. |
| 4,451,911 A | 5/1984 | Klose et al. |
| 4,575,351 A | 3/1986 | Gonzalez |
| 4,696,653 A | 9/1987 | McKeefery |
| 4,717,363 A | 1/1988 | Refabert |
| 4,740,186 A | 4/1988 | Sirota |
| 4,809,335 A | 2/1989 | Rumsey |
| 4,840,602 A | 6/1989 | Rose |
| 4,857,030 A | 8/1989 | Rose |
| 4,915,635 A | 4/1990 | Ingenito et al. |
| 4,923,428 A | 5/1990 | Curran |
| 5,011,449 A | 4/1991 | Handy et al. |
| 5,079,538 A | 1/1992 | DeFino et al. |
| 5,083,962 A | 1/1992 | Pracas |
| 5,083,965 A | 1/1992 | Mayem |
| 5,092,811 A | 3/1992 | Bergenguer |
| 5,094,644 A | 3/1992 | Kelley |
| 5,096,424 A | 3/1992 | Carlberg |
| 5,281,180 A | 1/1994 | Lam et al. |
| 5,290,198 A | 3/1994 | Nakayama |
| 5,314,336 A | 5/1994 | Diamond et al. |
| 5,353,015 A | 10/1994 | Robinson |
| 5,376,038 A * | 12/1994 | Arad et al. .................. 446/297 |
| 5,443,388 A | 8/1995 | Jurmain et al. |
| 5,471,192 A | 11/1995 | Dash |
| 5,509,810 A | 4/1996 | Schertz et al. |
| 5,612,675 A | 3/1997 | Jennings et al. |
| 5,627,520 A | 5/1997 | Grubbs et al. |
| 5,695,381 A | 12/1997 | Truchsess |
| 6,048,209 A * | 4/2000 | Bailey ........................ 434/267 |
| 6,050,826 A | 4/2000 | Christianson et al. |

\* cited by examiner

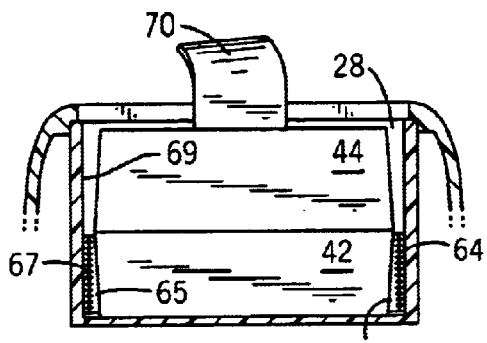
FIG. 5
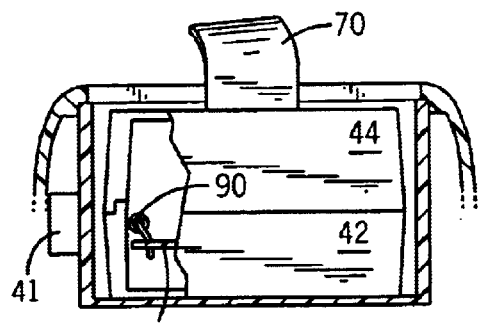
FIG. 6
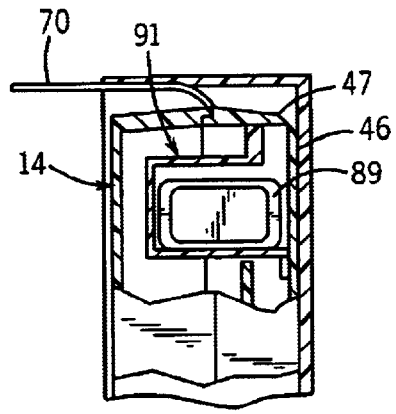
FIG. 7
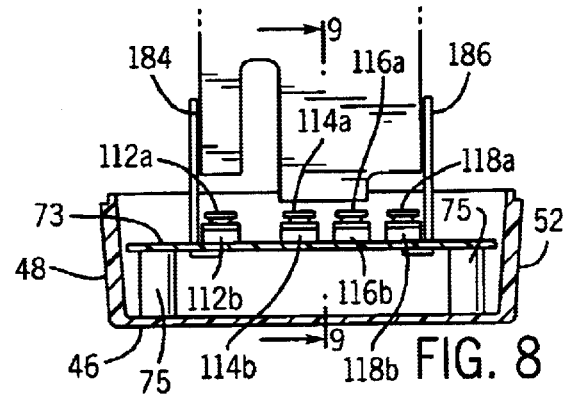
FIG. 8
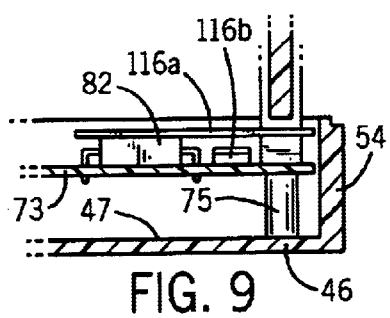
FIG. 9
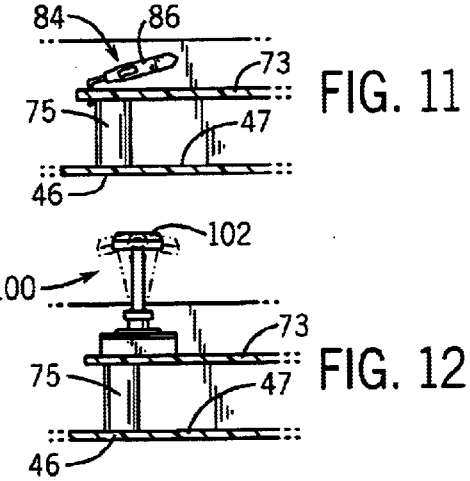
FIG. 11
FIG. 12
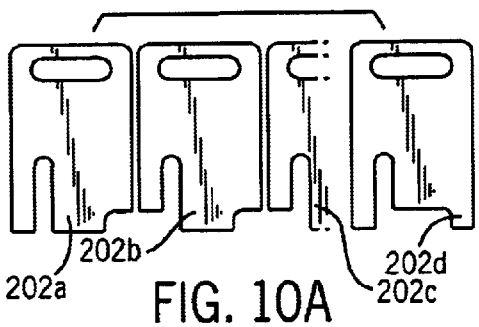
FIG. 10A
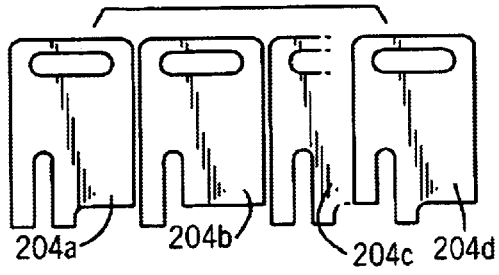
FIG. 10B

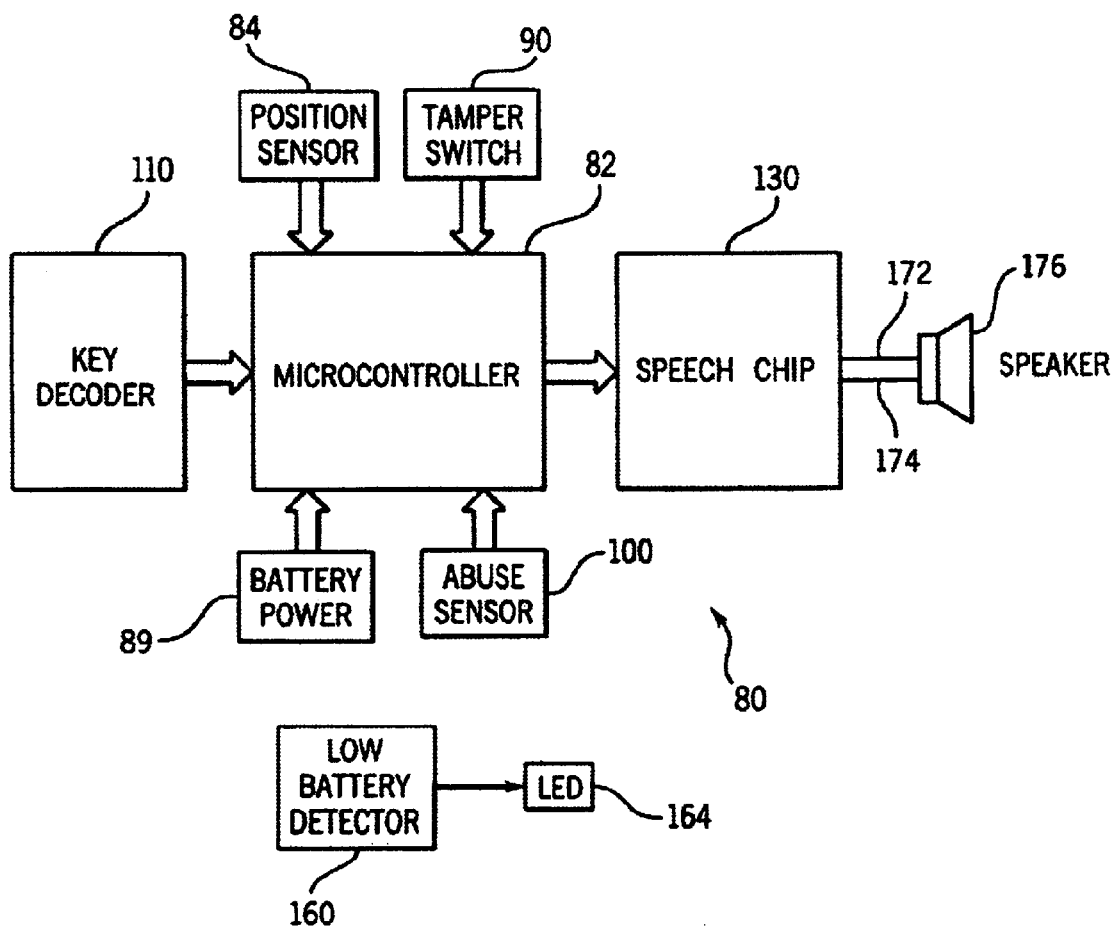

INFANT SIMULATION DEVICE AND METHOD THEREFORE

This application is a continuation of application Ser. No. 09/468,492, filed Dec. 20, 1999, now abandoned, which is a continuation of application Ser. No. 08/879,346, filed Jun. 20, 1997, now U.S. Pat. No. 6,050,826.

BACKGROUND AND SUMMARY OF THE INVENTION

This invention relates generally to mannequins, in particular, to a mannequin which simulates the activities of an infant in order to teach potential parents about the realities of parenthood.

Potential parents, such as teenagers, often fail to appreciate the rigors and realities of parenthood. As is known, parenting involves a great deal of time and energy. The demands for caring for a baby keep a parent on duty twenty-four hours a day, seven days a week. As a result, it is highly desirable to teach potential parents, especially teenagers, the many aspects of caring for an infant.

Heretofore, in order to teach individuals the realities and rigors of parenthood, infant simulation systems have been developed. For example, in Jurmain et al U.S. Pat. No. 5,443,388, an infant care simulation system is provided for use in teaching individuals the realities, responsibilities and constraints inherent in carrying for young babies. While the system described in the Jurmain et al '388 patent adequately simulates the crying of an infant, there are significant limitations which minimize the effectiveness of the Jurmain system for use as an educational tool for teaching individuals the realities and rigors of parenthood, and also the positive effects of parenthood.

In the system described in the Jurmain et al '388 patent, the infant cries at random intervals and for random lengths of time thereby demanding a response from the user. As such, monitoring by an instructor of a student's response to the simulated activities is difficult when the simulation system is removed from the instructor's presence. Consequently, methodology for recording the student's responses must be provided in the simulation system to monitor the activities of the student. A device or element for recording the student's responses may add significantly to the cost of the simulation system.

Further, prior art simulation systems typically do not include an element for monitoring the possible abuse thereof. In that infants are fragile and activities such as the shaking or dropping of an infant can cause permanent damage thereto, it is highly desirable to monitor this type of activity in order for instructors to assist a student with a potential problem and to discourage such activities by the student with an actual infant. Also, simulation systems such as the one described in the Jurmain et al '388 patent can be expensive to manufacture. Therefore, it is desirable to monitor the activities of the end user of the simulation system in order to minimize the potential damage thereto.

In addition, there are additional aspects to tending for an infant which are not provided for in prior art simulation systems. For example, it is often times difficult for a parent to know why an infant cries. As a result, it is highly desirable to develop a simulation system in which the student is required to determine the nature of the infant's crying.

Therefore, it is a primary object and feature of the present invention to provide an infant simulation device which teaches potential parents of the realities and rigors of parenthood.

It is a further object and feature of the present invention to provide an infant simulation device which may be used as an educational tool for teaching individuals the realities and rigors of parenthood.

It is a still further object and feature of the present invention to provide an infant simulation device which simulates a plurality of activities of an infant at predetermined time periods.

It is a still further object and feature of the present invention to provide an infant simulation device wherein a user's responses to the activities simulated by the device are easily monitorable.

It is a further object and feature of the present invention to provide an infant simulation device which monitors the possible abuse and/or tampering of the same.

It is a still further object and feature of the present invention to provide an infant simulation device which requires the user to determine the nature of the simulated activities generated by the device.

In accordance with the present invention, a device is provided for simulating the activities of an infant. The device includes a mannequin and a control module positioned within the mannequin for generating one of a plurality of simulated activities by the mannequin at predetermined time intervals. The device also includes a plurality of response elements. Each response element corresponds to a distinct, corresponding simulating activity. A reader element is operatively connected to the control module for receiving a response element therein. The control module terminates the one of a plurality of simulated activities in response to receiving the proper, response element within the reader element, and thereafter generate positive feedback to the user to indicate a correct action has taken.

The device further includes an abuse indicator interconnected to the mannequin. The abuse indicator generates a signal in response to a predetermined force on the mannequin. The abuse indicator includes a toggle switch movable between a first, normal operating position and a second, abuse position in response to a predetermined force on the mannequin. A light emitting diode is provided for generating a visual signal in response to the moving of the toggle switch to the second, abuse position. In addition, a sound generator is provided for generating an audible abuse signal in response to the moving of the toggle switch into the second, abused position. One of the plurality of response elements constitutes an attention element, wherein receipt of the attention element within the reader element terminates the audible abuse signal after a predetermined period.

One of the plurality of response elements constitutes a panic element. Receipt of the panic element within the reader element terminates any of the simulated activities generated by the control module, however, the program will continue. In addition, the control module generates a panic signal in response to receipt of the panic element within the reader element.

A control module is powered by a power source, such as a battery. A low power indicator is operatively connected to the power source. The lower power indicator generates a visual signal if the power supplied by the power source decreases below a predetermined level.

The device of the present invention further includes a tamper indicator interconnected to the control module for generating a tamper signal if the control module is removed from the mannequin. The tamper indicator includes a tamper switch movable between a first, normal operating position, and a second, tampered position in response to the unauthorized removal of the control module from the mannequin. The tamper indicator also includes a light emitting diode for generating a signal in response to the moving of the tamper switch to the tampered position.

The control module of the infant simulation device of the present invention includes a microprocessor and sound generating structure responsive to commands from the microprocessor. The reader element includes a plurality of switches operatively connected to the microprocessor of the control module. Each switch is movable between an open and a closed position. Each response element includes a key having distinct, coded bitting thereon. By inserting a response element into the reader element, the coded bitting closes a unique, corresponding combination of switches of the reader element. This, in turn, provides a unique, corresponding signal to the microprocessor.

The control module and the reader element are housed in a housing. The housing has a slot therein so as to allow for insertion of a response element. The housing is positioned within a cavity in the mannequin. A hook and pile element is utilized to maintain the housing within the cavity. A flexible tab member extends from the housing so as to facilitate removal of the housing from the mannequin.

Finally, a sensor is provided for monitoring the position of the mannequin and for providing a signal to the control module in response to the positioning of the mannequin in a predetermined, non-acceptable position. In response to the signal generated by the sensor, the control module generates an audio signal to indicate the positioning of the mannequin in a non-acceptable position.

In accordance with the present invention, a method is also provided for simulating activities of an infant. The method includes providing a mannequin and generating one of a plurality of simulated activities by the mannequin at predetermined time intervals. A response element is selected corresponding to the simulated activity in order to terminate the simulated activity by the mannequin.

The method of the present invention may also include the additional step of generating a visual signal in response to a predetermined force on the mannequin. Further, an audible signal may be generated in response to a predetermined force on the mannequin. The audible signal may be terminated with a selected response element.

The method contemplates providing a panic element and generating a signal with the panic element so as to terminate any of the simulated activities by the mannequin. If an activity is terminated by a panic element, the method contemplates generating a panic signal in response thereto so as to indicate to an instructor use of the same.

Power is supplied for generating the simulated activities by the mannequin. The method contemplates monitoring the power supplied and generating a signal in response to the power decreasing below a predetermined level.

The plurality of simulated activities by the mannequin are performed according to a program. It is contemplated that a plurality of programs may be constructed, with an instructor having the ability to select a desired program for generating the simulated activities.

BRIEF DESCRIPTION OF THE PREFERRED EMBODIMENT

The drawings furnished herewith illustrate a preferred construction of the present invention in which the above advantages and features are clearly disclosed as well as others which will be readily understood from the following description of the illustrated embodiment.

In the drawings:

FIG. 5 is a bottom plan view, partially in section, showing the simulator of FIG. 4 installed within the infant simulation device of the present invention;

FIG. 6 is a bottom plan view, similar to FIG. 5, with portions broken away, showing the simulator of FIG. 4 installed within the infant simulation device of the present invention;

FIG. 7 is a side elevational view, with portions broken away, showing the simulator of FIG. 4 installed within the infant simulation device of the present invention;

FIG. 8 is a cross-sectional view of the simulator of FIG. 4 and a key element for use therewith;

FIG. 9 is a cross-sectional view of the simulator of FIG. 8 taken along line 9—9;

FIG. 10a is a side elevational view showing a plurality of program key elements for use in connection with the infant simulation device of the present invention;

FIG. 10b is a side elevational view showing a plurality of response key elements for use in connection with the infant simulation device of the present invention;

FIG. 11 is a cross-sectional view of a portion of the simulator incorporated into the present invention showing a position switch for use therewith;

FIG. 12 is a cross-sectional view of a portion of the simulator incorporated into the present invention showing an abuse switch for use therewith;

FIG. 13 is a block diagram showing the electronic circuitry of the simulator incorporated into the present invention;

BRIEF DESCRIPTION OF THE ILLUSTRATED EMBODIMENTS

Figures 1, 2:
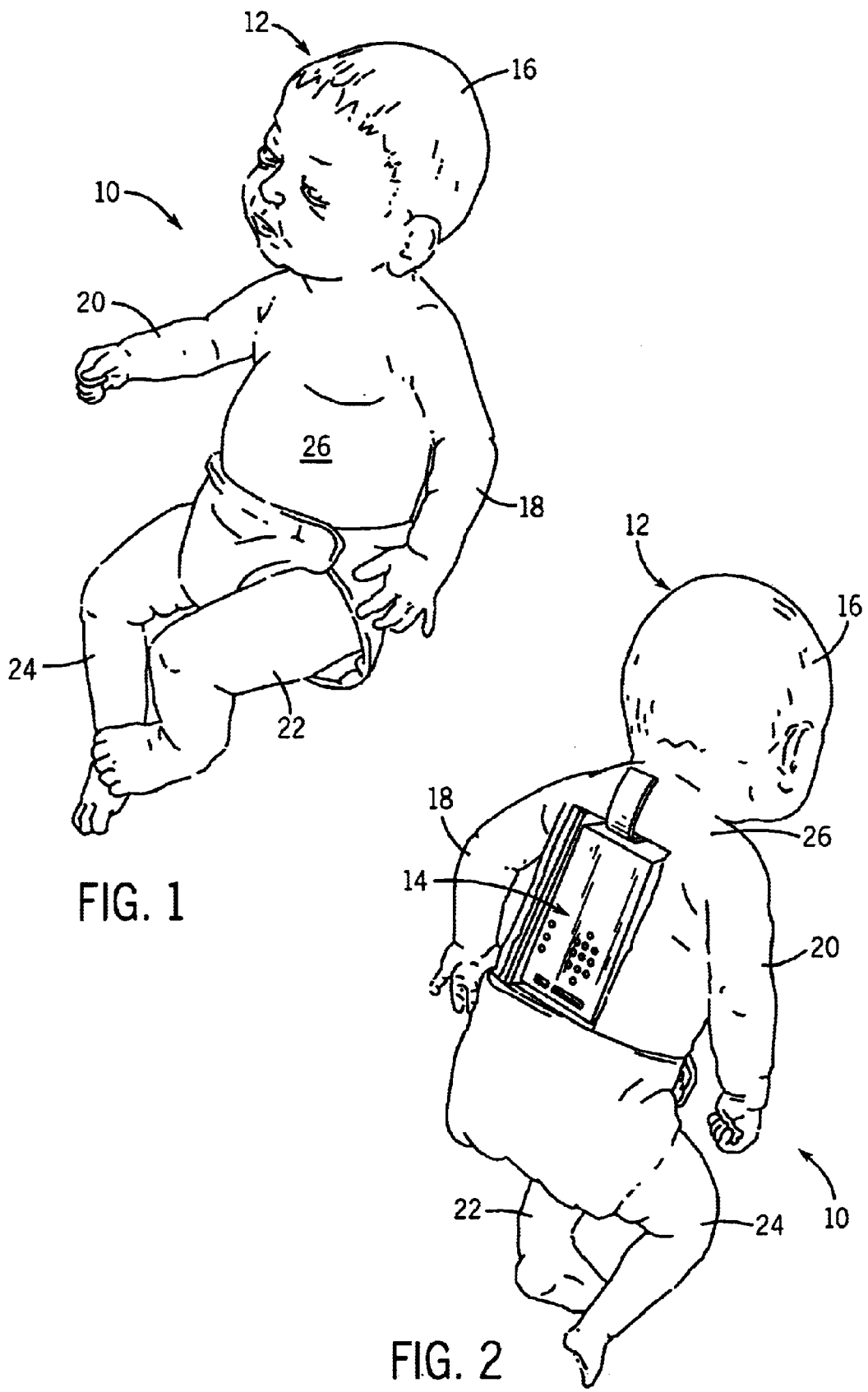
FIG. 1 is an isometric view of an infant simulation device in accordance with the present invention.
FIG. 2 is a rear elevational view of the infant simulation device of FIG. 1.
Figure 3:
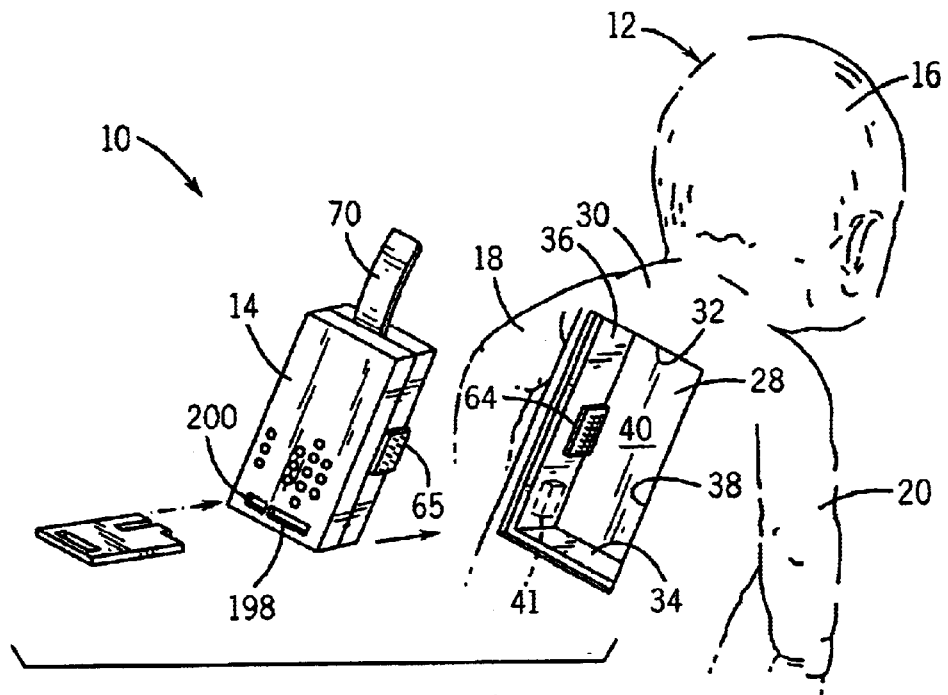
FIG. 3 is an exploded, rear elevational view showing a portion of the infant simulation device of FIG. 2.

Referring to FIGS. 1–3, the infant simulation device of the present invention is generally designated by the reference numeral 10. Infant simulation device 10 includes a mannequin 12 and a simulator 14 mounted therein. As is shown, mannequin 12 is in the form of a young, anatomically correct infant. It is contemplated that mannequin 12 may incorporate any selected ethnic characteristic or be of either sex.

Mannequin 12 includes a head 16, first and second arms 18 and 20, first and second legs 22 and 24, and a torso 26. A simulator receipt cavity 28 is formed in the back 30 of torso 26. Cavity 28 is defined by upper and lower walls 32 and 34, respectively, sidewalls 36 and 38, and recessed wall 40. As best seen in FIGS. 2 and 5–7, cavity 28 is dimensioned so as to receive simulator 14 therein. A magnet 41 is mounted to the outside of sidewall 36, for reasons hereinafter described.

Figure 4:
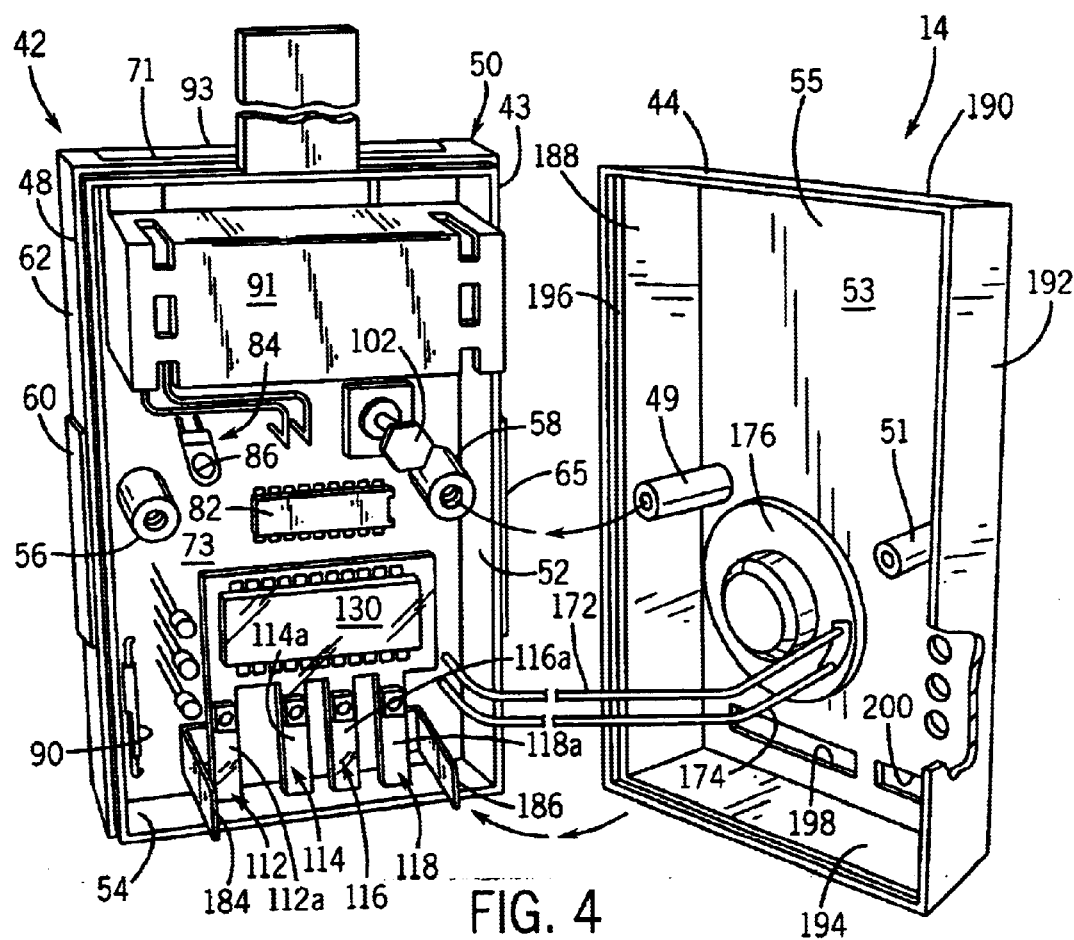
FIG. 4 is an exploded, front elevational view of the simulator of the infant simulation device of the present invention.
Figure 14:
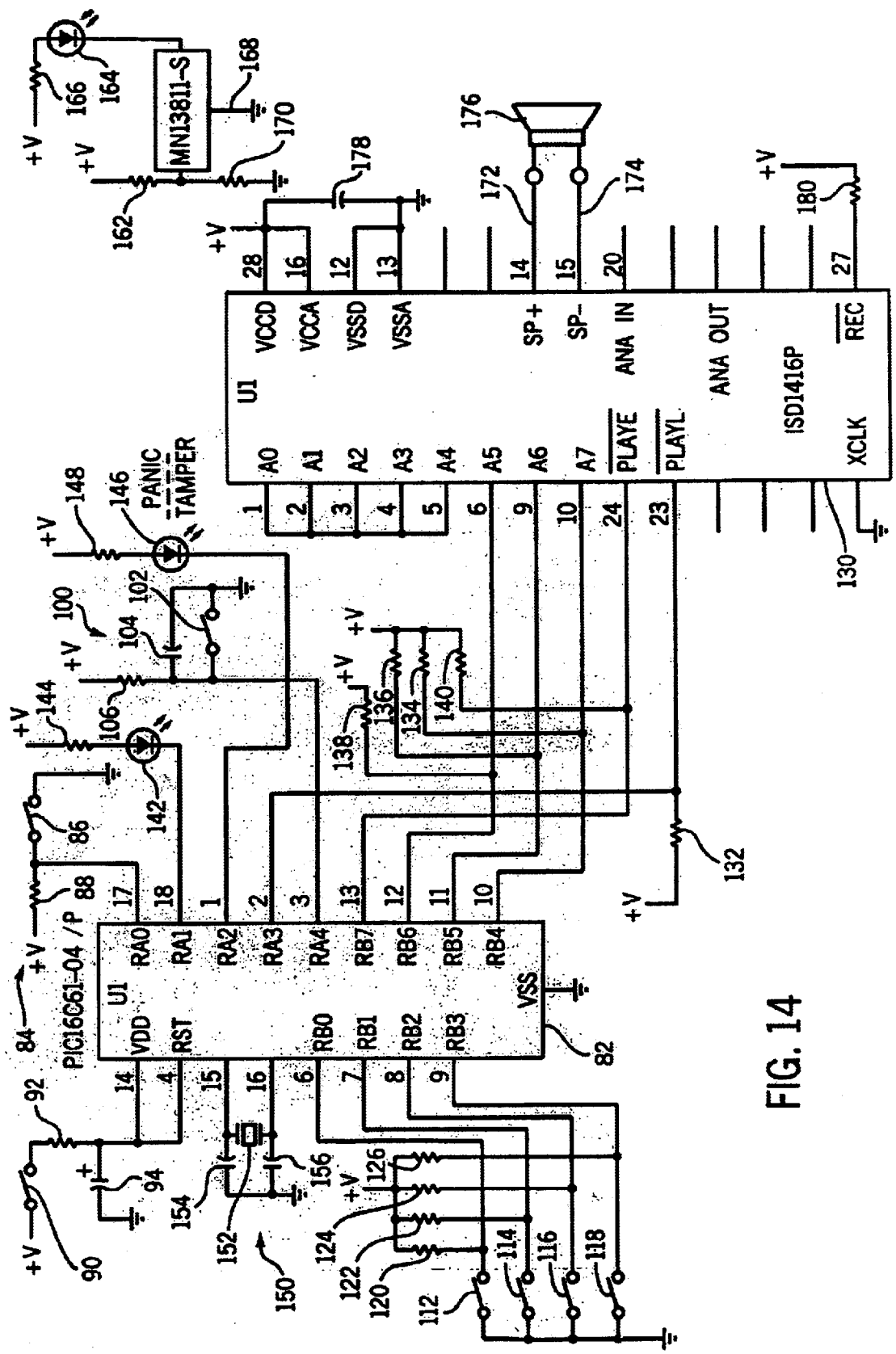
FIG. 14 is an electrical schematic of the simulator incorporated into the present invention.

Referring to FIG. 4, simulator 14 includes first 42 and second 44 housing portions which house the electronic circuitry shown and described in FIGS. 13–14. First housing portion 42 includes a forward wall 46 and sidewalls 48, 50, 52 and 54 so as to define a box-like structure. A rib 43 extends along sidewalls 48, 50, 52 and 54 in order to facilitate the joining of first 42 and second 44 housing portions. First 56 and second 58 mounting elements project rearwardly from the inner surface 47 of forward wall 46 and are positioned so as to align with mounting elements 49 and 51 which project forwardly from the inner surface 53 of rear wall 55 of second housing portion 44.

One of a hook and pile element is affixed to the outer surface 62 of sidewall 48 of first housing portion 42, while the other 64 is affixed to the inner surface of sidewall 36 of cavity 28. Similarly, one 65 of a hook and pile element is affixed to the outer surface 66 of sidewall 52 of first housing element 42, while the other 67 is affixed to the inner surface 69 of sidewall 38 of cavity 28 in mannequin 12. As best seen in FIG. 5, the hook and pile elements are used to secure simulator 14 within cavity 28 of mannequin 12. First housing portion 42 also includes a flexible tab member 70 extending from the outer surface 71 of sidewall 50 in order to facilitate the removal of simulator 70 from cavity 28, as hereinafter described.

Simulator 14 also includes electronic circuitry for generating predetermined simulated activities by the infant simulation device 10. Electronic circuitry 80 is supported within simulator 14 on a circuit board 73 which is interconnected to and spaced from the forward wall 46 of first housing portion 42 by circuit board supports 75. Referring to FIG. 13, a block diagram of the electronic circuitry housed in the simulator 14 is provided. The electronic circuitry of the simulator 14 is generally designated by the reference number 80. Referring to FIGS. 4, 13 and 14, electronic circuitry 80 includes a microcontroller 82 mounted to circuit board 73 of first housing portion 42, FIG. 9. In the preferred embodiment, microcontroller 82 is a microprocessor such as Motorola Part No. PIC16C61-04/P which is programmed for running four different event programs which determine the simulated activities performed by device 10.

Circuitry 80 also includes a position sensor 84 and a tamper switch 90 which are operatively connected to microcontroller 82. Position sensor 84 is mounted to circuit board 73 within first housing portion 42, FIG. 11, and includes a mercury switch 86 which has a first end connected to pin 17 of microcontroller 82 and a second end connected to ground, FIG. 14. Pin 17 is also connected through resistor 88 to a voltage source +V such as battery 89.

Referring to FIG. 7, battery 89 is supported within simulator 14 by battery support structure 91. A removable panel 93 is provided in the forward wall 46 of first housing portion 42 of simulator 14 in order to allow access to battery 89 within battery support structure 91.

Tamper switch 90 comprises a magnetic switch mounted to circuit board 73 within first housing member 42, FIGS. 2 and 6. Tamper switch 90 has a first end interconnected to pins 4 and 14 of microcontroller 82 through resistor 92, FIG. 14. A second end of tamper switch 90 is connected to voltage source +V. Pins 14 and 4 are also connected to ground through capacitor 94.

Circuitry 80 further includes an abuse sensor 100 having a toggle switch 102 mounted to circuit board 73 of first housing member 42, FIG. 12. Toggle switch 102 has a first end connected to ground and a second end connected to pin 3 of microcontroller 82, FIG. 14. A capacitor 104 is mounted in parallel with toggle switch 102. The second end of toggle switch 102 is also connected to voltage source +V through resistor 106.

Key decoder 110 includes first 112, second 114, third 116, and fourth 118 switches, FIG. 4. Each switch 112, 114, 116, 118 includes a flexible read portion 112a, 114a, 116a, 118a, respectively, resiliently spaced from a corresponding contact switch 112b, 114b, 116b, 118b, respectively. Each contact switch 112b, 114b, 116b, 118b is mounted to and supported by circuit board 73. Each contact switch 112b, 114b, 116b, 118b has a first end interconnected to a corresponding pin 6, 7, 8 and 9, respectively, of microcontroller 82 and a second end connected to ground. Further, each first end of contact switches 112b, 114b, 116b, 118b is interconnected to voltage source +V through a corresponding resistor 120, 122, 124, 126, respectively.

Pins 2, 10, 11, 12 and 13 of microcontroller 82 are interconnected to corresponding pins 23, 10, 9, 6, and 24, respectively, of a speech chip 130 thereby allowing microcontroller 82 to control the output of speech chip 130 at pins 14 and 15. It is contemplated that speech chip 130 be of the type sold by ISD under the Model Number 1416P. Pins 2, 10, 11, 12, 13 are also connected through corresponding resistors 132, 134, 136, 138, 140, respectively, to voltage source +V.

Microcontroller 82 is also connected to voltage source +V at pin 18 through abuse LED 142 and resistor 144 which are in series. Similarly, pin 1 of microcontroller 82 is connected to voltage source +V through panic/tamper LED 146 and resistor 148 which are in series. The timing of microcontroller 82 is controlled by an external oscillator circuit 150 which includes an oscillator 152 having first and second ends connected to ground through corresponding capacitors 154 and 156, respectively, as is conventional.

Circuitry 80 further includes a low battery detector 160 such as Model No. MN13811-S. Battery detector 160 is connected to voltage source +V through resistor 162 and through a low battery LED 164 and resistor 166 combination which are connected in series. Low battery detector 160 is also connected directly to ground through line 168 and through resistor 170.

Pins 14 and 15 of speech chip 130 are interconnected through lines 172 and 174, respectively, to speaker 176 so as to allow speech chip 130 to generate sound therethrough. As best seen in FIG. 4, speaker 176 is mounted to the inner surface 53 of rear wall 55 of second housing portion 44. Pins 16 and 28 of speech chip 130 are tied together, and thereafter interconnected to voltage source +V, and through capacitor 178, to ground. Pins 1–5 of speech chip 130 are tied together, while pins 12 and 13 of speech chip 130 are tied together and also tied to ground. Pin 27 of speech chip 130 is connected to voltage source +V through resistor 180, and speech chip 130 is grounded at pin XCLK.

Also mounted to circuit board 73 are first 184 and second 186 key guide elements, FIGS. 4 and 8, which project rearwardly from circuit board 73. Key guide elements 184 and 186 are laterally spaced in order to accommodate a key element therebetween.

Second housing portion 44 is defined by rear wall 55 and sidewalls 188, 190, 192 and 194. A groove 196 extends along the edges of walls 188, 190, 192 and 194 and is adapted for receiving rib 43 therein.

In an assembled condition, rib 43 of first housing portion 42 is received within groove 196 of second housing portion 44. In order to interconnect first 42 and second 44 housing portions of simulator 14, a screw is threaded through mounting element 49 of second housing portion 44 and into first mounting element 56 of first housing portion 42. Similarly, a screw is threaded through mounting element 51 of second housing portion 44 and into second mounting element 58 of first housing portion 42. Simulator 14 is then inserted into cavity 28 such that the hook and pile elements described above maintain simulator 14 within cavity 28, FIG. 5. As best seen in FIGS. 2 and 5–6, flexible tab member 70 is positioned so as to project outwardly from cavity 28 in order to facilitate removal of simulator 14 from cavity 28.

Rear wall 55 of second housing portion 44 of simulator 14 includes first and second slots 198 and 200 which are adapted for receiving program keys 202a–d, FIG. 10a, and/or various response keys, for example 204a–d, FIG. 10b, therein. Each key 202a–b and 204a–b includes a distinct coded end which engages a unique combination of flexible read portions 112a, 114a, 116a, 118a of switches 112, 114, 116 and 118, respectively, so as to close corresponding contact switches 112b, 114b, 116b and 118b, respectively. This, in turn causes the pins 6, 7, 8, 9 of microcontroller 82 which are interconnected to the contact switches 112a, 114a, 116a, 118a which have been closed to a change state, thereby providing a unique, corresponding digital signal at pins 6, 7, 8, 9 of microcontroller 82. As a result, each key inserted into slots 198 and 200 generates a unique, corresponding digital signal to microcontroller 82. Based upon this digital signal, microcontroller 82 determines if the proper responses have been provided by a user to the programmed events generated by the electronic circuitry 80 of simulator 14, as hereinafter described.

In a preferred construction, microcontroller 82 may be programmed for running four distinct event programs. Each event program consists of three types of programmed events: diaper change, feeding and burping, and attention. In the preferred construction, there are three programs that can be selected by an instructor plus a demonstration option. A sample program is shown below:

| Time | Time from Last Event | Event | Duration In Minutes |
|---|---|---|---|
| 0:00 | 0 minutes | Reset | 0 |
| 0:20 | 20 minutes | Diaper Change (1) | 5 |
| 3:55 | 215 minutes | Feeding & Burping (1) | 30 |
| 5:48 | 108 minutes | Attention (1) | 15 |
| 6:22 | 34 minutes | Diaper Change (2) | 5 |
| 8:46 | 144 minutes | Feeding & Burping (2) | 30 |
| 9:58 | 72 minutes | Diaper Change (3) | 5 |
| 12:49 | 171 minutes | Feeding & Burping (3) | 30 |
| 13:40 | 51 minutes | Attention (2) | 15 |
| 17:55 | 255 minutes | Feeding & Burping (4) | 30 |
| 18:42 | 47 minutes | Diaper Change (4) | 6 |
| 22:30 | 228 minutes | Feeding & Burping (5) | 30 |
| 24:52 | 142 minutes | Diaper Change (5) | 5 |
| 26:35 | 95 minutes | Attention (3) | 15 |
| 27:49 | 74 minutes | Diaper Change (6) | 5 |
| 29:32 | 103 minutes | Feeding & Burping (6) | 30 |
| 31:20 | 76 minutes | Diaper change (7) | 5 |
| 32:12 | 52 minutes | Feeding & Burping (7) | 30 |
| 36:50 | 278 minutes | Diaper Change (8) | 5 |
| 37:23 | 33 minutes | Feeding & Burping (8) | 30 |
| 39:10 | 107 minutes | Attention (4) | 15 |
| 41:19 | 129 minutes | Diaper Change (9) | 5 |
| 43:56 | 157 minutes | Feeding & Burping (9) | 30 |
| 46:21 | 145 minutes | Diaper Change (10) | 5 |
| 47:42 | 81 minutes | Feeding & Burping (10) | 30 |

Each program is approximately equal in length and consists of approximately 25 different events. Each of the programs has fixed times at which the events occur. These predetermined times are known to the instructor, but not to the student.

In operation, an instructor selects one of the three above-described programs programmed in microcontroller 82 when assigning a mannequin to a particular student. Each program, as described above, includes a realistic number of times that the simulation system must be fed, burped, diapered or given attention. The programs are selected by the instructor by inserting one of the four program keys 202a–d, FIG. 10a, into slots 198 and 200 of simulator 14 as shown in FIG. 3. As previously described, each program key 202a–d includes a unique coded tab for engaging corresponding read portions 112a, 114a, 116a, and 118a of switches 112, 114, 116, 118, respectively. As best seen in FIG. 8, when a selected program key 202a–d is inserted into slots 198 and 200 in simulator 14, the coded tab of the selected program key engages and depresses a predetermined corresponding read portion(s) 112a, 114a, 116a, 118a of switches 112, 114, 116, 118, respectively, which, in turn, closes a corresponding contact switch 112b, 114, 116b, 118b. By closing a corresponding, predetermined contact switch, a digital signal is sent to microcontroller 82 so as to activate the selected program. If a non-program key is inserted into slots 198 and 200 of simulator 14, nothing will happen. However, if a proper program key 202a–d is inserted, and the program is activated, microcontroller 82 sends a digital signal from pins 2 and 10–13 to speech chip 30. In response to these digital signals, speech chip 130 generates a cooing sound through speaker 176.

Once a program is activated, the microcontroller 82 will cause speech chip 130 to generate a crying sound from speaker 176 at predetermined intervals according to the program selected. For example, at specific times, a crying sound will be generated in order for the infant simulation device 10 to simulate that the infant is wet and wants its diaper changed. The crying will continue until the student inserts the proper response key, i.e. diaper change key 204a, FIG. 10b. If the student inserts any other key, the infant will continue to cry.

Upon insertion of the diaper change key 204a in slots 198 and 200 in simulator 14, a digital signal is sent to microcontroller 82 which, in turn, instructs the speech chip 130 to terminate the crying sound to generate a cooing sound at speaker 176 to indicate that the correct action has been taken. The diaper change period lasts a predetermined time period which students do not know in advance. Ten seconds before the end of diaper change period, the microcontroller 82 instructs the sound chip 130 to generate a cooing sound at speaker 176. The diaper change key 204a must then be reinserted into slots 198 and 200 to end the diaper change period. If the diaper change key 204a is not reinserted, the speech chip 130 will continue to generate a crying sound at speaker 176. After reinsertion of the proper diaper change key 204a, the microcontroller 82 will instruct speech chip 130 to terminate the crying sound and to generate a cooing sound at speaker 176.

At specific times determined by the selected program, microcontroller 82 will instruct speech chip 130 to generate a crying sound at speaker 176 to simulate that the infant is hungry. The crying sound will continue until a student inserts the feed key 204b into slots 198 and 200 in simulator 14. By inserting the proper feed key 204b into slots 198 and 200, a digital signal is provided to microcontroller 82 which, in turn, causes microcontroller 82 to instruct speech chip 130 to terminate the crying sounds and to generate a cooing sound to indicate that the correct action has been taken.

However, if a student inserts any other key in slots 198 and 200, the crying sound will continue.

In the preferred embodiment, the feeding period lasts twenty minutes. Students do not know the duration of the feeding period in advance. Ten seconds before the end of the feeding period, microcontroller 82 will instruct speech chip 30 to generate a cooing sound at speaker 176 indicating to the student that the infant needs to be burped. If the burp key 204c, FIG. 10b, is inserted within slots 198 and 200 within the ten second period, the microcontroller 82 will instruct speech chip 130 to generate a cooing sound at speaker 176 so as to indicate the beginning of the burping period. If any other key is entered into slots 198 and 200 or if the burp key 204c is not inserted within ten seconds, microcontroller 82 will instruct speech chip 130 to generate a crying sound at speaker 176 until the burp key 204c is inserted.

The burping period last ten minutes. The duration of the burping period is not known to the students in advance. Ten seconds before the end of the burping period, the microcontroller 82 will instruct speech chip 130 to generate a cooing sound at speaker 176. Thereafter, the burp key 204c must be reinserted into slots 198 and 200 in order to end the burping period. If the burp key 204c is not reinserted into slots 198 and 200, the microprocessor will instruct speech chip 130 to generate a continuous crying sound at speaker 176. When the burp key 204c is inserted into slots 198 and 200, the microcontroller 82 will terminate the burping period and will cause speech chip 130 to generate a cooing sound at speaker 176.

At predetermined times, microcontroller 82 will instruct speech chip 130 to generate a crying sound at speaker 176 in order to simulate that the infant is unhappy and desires attention. The crying sound will continue until a student inserts the proper response key, i.e. attention key 204d, FIG. 10b, into slots 198 and 200. If the student inserts any other key into slots 198 and 200, the crying sound will continue. Upon insertion of the attention key 204d into slots 198 and 200, a digital signal is sent to microcontroller 82 which, in turn, instructs speech chip 130 to terminate the crying sound and, thereafter, to generate a cooing sound to indicate to the student that a correct action has been taken.

The attention period lasts fifteen minutes. The duration of the attention period is not known in advance to the students. Ten seconds before the end of the attention period, microcontroller 82 instructs speech chip 130 to generate a cooing sound at speaker 176. The attention key 204d must then be reinserted in slots 198 and 200 in order to end the attention period. If the attention key 204d is not reinserted or if any other key is inserted, the crying sound will continue. Upon insertion of the attention key 204d into slots 198 and 200, the microcontroller 82 will instruct speech chip 130 to terminate the crying sounds at speaker 176, and thereafter, to generate a cooing sound.

If, for some reason, a student cannot determine how to stop the crying sound generated by the circuitry 80, a panic key (not shown) is provided which can be inserted into slots 198 and 200 in simulator 14, in order to provide a digital signal to microcontroller 82 that instructs microcontroller 82 to terminate the present programmed event, i.e. diaper change, feed and burp, or attention. However, when the panic key is inserted in slots 198 and 200, microcontroller generates a signal at pin 1 causing the tamper/panic LED 146 to start flashing. Further, the panic key will only terminate the present period (e.g. diaper change, feed and burp, or attention). The selected program will continue as the tamper/panic LED 146 continues to flash.

In order to stop the flashing of the tamper/panic LED 146, the instructor must insert a teacher reset key (not pictured) into slots 198 and 200 of simulator 14. Upon receipt of the teacher reset key in slots 198 and 200, a digital signal is sent to microcontroller 82 which causes microcontroller 82 to terminate the flashing of the tamper/panic LED.

If mannequin 12 is held or positioned incorrectly, mercury switch 86 will close thereby causing pin 17 to go high which, in turn, causes microcontroller 82 to instruct speech chip 130 generate a crying sound at speaker 176. However, to allow for normal handling, microcontroller 82 provides for a ten second delay before instructing speech chip 130 to generate the crying sound at speaker 176.

In a preferred embodiment, mannequin 12 must be positioned on its back during sleep or microcontroller 82 will cause speech chip 130 to generate a crying sound at speaker 176. Similarly, mannequin 12 must be in an upright position or on its back when being held or microcontroller 82 will instruct speech chip 130 to generate a crying sound at speaker 176. In order to facilitate handling during the diaper change, feeding and burping and attention periods, microcontroller 82 will not monitor the position of mannequin 12 during such periods.

If the mannequin 12 is abused, such as by dropping or hitting, toggle switch 102 will pivot as shown in phantom in FIG. 12 and close thereby causing pins 4 and 14 to switch state which, in turn, causes microcontroller 82 to instruct speech chip 130 to generate a crying sound at speaker 176. The crying sound cannot be stopped by the student during the first minute after the abusive activity. After one minute, the student can terminate the crying sound by inserting the attention key 204d into slots 198 and 200 as previously described.

In addition to generating the crying sound in response to abuse, microcontroller 82 generates a signal at pin 1 causing the tamper/panic LED 146 to start flashing. The flashing cannot be stopped by the student, only by the insertion of the teacher reset key into slots 198 and 200 of simulator 14 as described above. However, after the abuse has taken place, the selected program will continue normally.

In order to prevent tampering with the circuitry 80, tamper switch 90 is provided. Tamper switch 90 is in the form of a magnetic switch which is maintained in a normally opened position by magnet 41 when simulator 14 is received within cavity 28 in the back 30 of mannequin 12. If a student attempts to remove simulator 14 from cavity 28 in mannequin 12, magnetic switch 90 will close thereby causing microcontroller 82 to generate a signal at pin 1 such that tamper/panic LED 146 will start to flash. As previously described, only the insertion of the teacher reset key into slots 198 and 200 of simulator 14 can stop the flashing of the tamper/panic LED 146.

Figure 15:
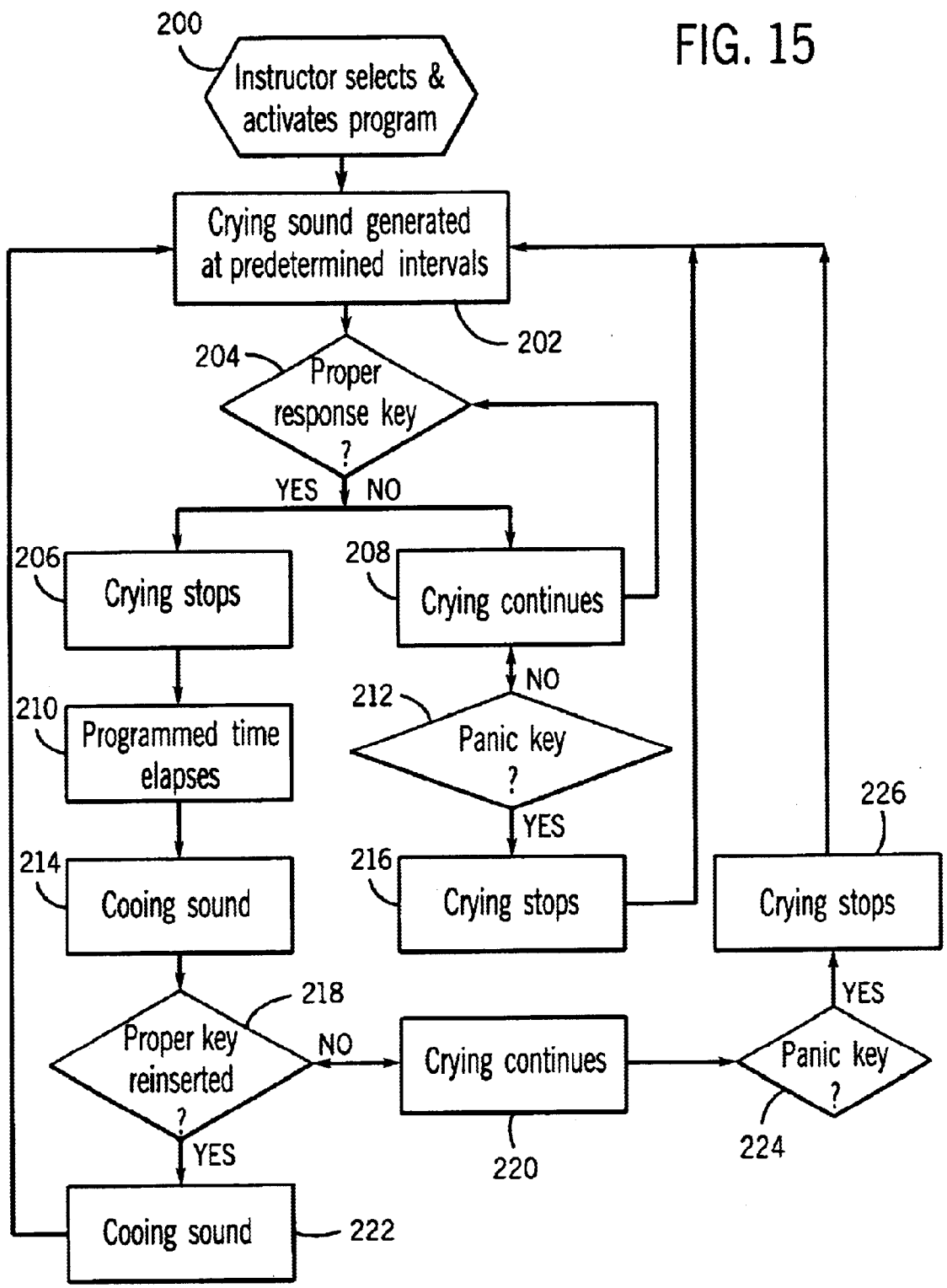
FIG. 15 is a flow chart showing the steps of operating the simulator generally, including a panic key step.
Figure 16:
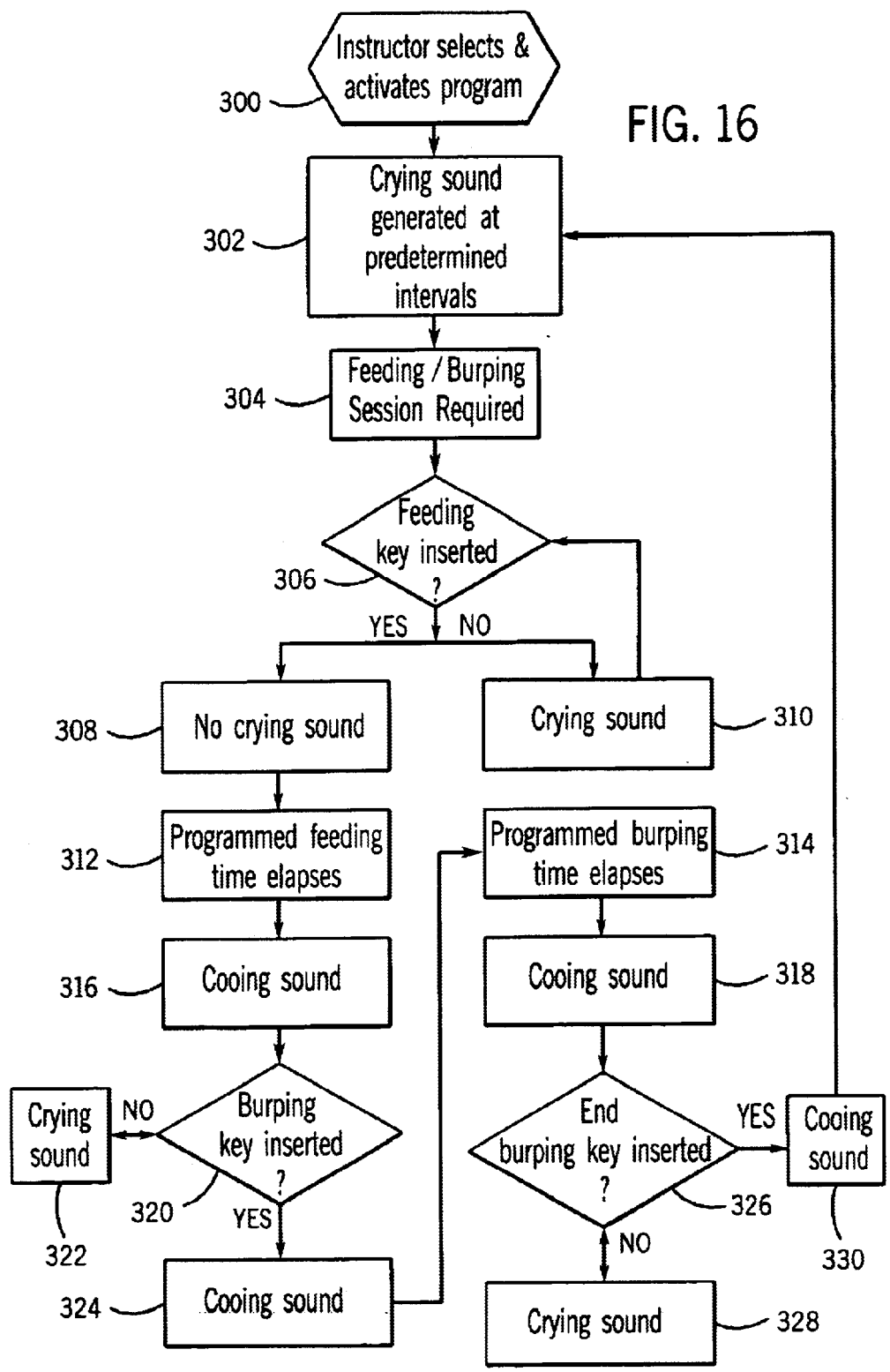
FIG. 16 is a flow chart showing the steps of operating the simulator when it is simulating a required feeding followed by a required burping.

FIGS. 15 and 16 illustrate in flow chart form the steps as set forth above in connection with operation of the present invention. As noted above, in step 200 an instructor selects and activates one of the four programs available in the preferred embodiment of the infant simulator. After activation, the simulator follows the selected program and generates a crying sound at predetermined intervals 202. The student must attend to the simulator demands by selecting the proper response key at 204. Until the proper response key is inserted, the simulator continues crying at 208. When the proper response key is inserted, the crying stops at 206 and a programmed length of time begins to elapse at 210, representing the length of a care session. Near the end of the care session, the simulator will coo at 214, indicating that the proper response key must be reinserted at 218 to complete the care session. If the proper key is reinserted, another cooing sound at 224 indicates that the care session has been completed successfully and the program continues to generate crying sounds at predetermined, realistic intervals 202.

If, at step 204 or step 218, the student does not insert the proper response key, crying continues at 208, 220 until the proper response key is inserted. Another feature illustrated in FIG. 15 is the panic key discussed above. When crying continues as in steps 208 or 220 and the student cannot, for whatever reason, insert the proper key, he or she may insert the panic key as shown in steps 212 and 226. This stops the simulated crying at 216, 228, and terminates the care session. The program returns to step 202 and continues to generate crying sounds at predetermined intervals.

FIG. 16 specifically illustrates the steps in the feeding/burping care session. The instructor again selects and activates a program 300 and a crying sound is periodically generated at 302. When the program generates a crying sound that requires a feeding and burping care session 304 and the feeding key is inserted at 306, the crying stops at 308. However, notwithstanding the panic key discussed above (not shown in this drawing) the crying continues at 310 until a feeding key is inserted at step 306. After the key has been inserted and the crying has stopped, a period of time simulating a realistic baby feeding time elapses at 312. Toward the end of that period, a cooing sound at 316 indicates that the feeding is nearing an end and that burping will be required. Again notwithstanding the existence of the panic key, if the burping key is not inserted, the crying sound 322 will be heard until the burping key is inserted at step 320.

When the burping key is inserted at 320, a cooing sound is heard at 324 and a realistic period of time for baby burping elapses at 314. Toward the end of the burping period, another cooing sound at 318 is played to indicate that the end of the burping session is nearing. An "end burping" key must be inserted at 326 to prevent crying at 328. When the end burping key is inserted at 326, the simulator emits another cooing sound at 330 and returns to the programmed sequence 302.

It is contemplated as being within the scope of the present invention to program microcontroller 82 to generate the crying and cooing sounds for predetermined lengths of time. It is further contemplated that the program keys 202a–d and the response keys 204a–d may be removed immediately after insertion into slots 198 and 200.

It is contemplated as being within the scope of the present invention to provide a student responsive sheet designed to allow the students to keep track of the type of care required by the infant simulation system, as well as the time at which the care was given. In that the events occur at predetermined time periods, a teacher correction template may be constructed in order to check the activities performed by the student versus the program for grading purposes or the like.

Various modes of carrying out the invention are contemplated as being within the scope of the following claims particularly pointing out and distinctly claiming the subject matter which is regarded as the invention.

We claim:

1. An infant simulation system, comprising:
   a mannequin;
   a control module associated with the mannequin and including an output arrangement for simulating one or more infant activities;
   a response arrangement operatively interconnected with the control module for terminating the one or more infant activities without terminating subsequent infant activities; and
   an operating arrangement associated with the control module, wherein the operating arrangement includes a series of programs, each of which corresponds to a predetermined schedule of the one or more infant activities, and a program selection arrangement for selecting at least one of the programs so as to operate the control module and simulate one or more infant activities according to the predetermined schedule of at least one of the programs.

2. The infant simulation system of claim 1, wherein the control module includes a series of switches and wherein the program selection arrangement includes an actuator for engaging the switches in selected configurations, wherein each switch configuration corresponds to one of the programs.

3. The infant simulation system of claim 1, wherein the one or more infant activities comprise feeding, burping and diaper change.

4. The infant simulation system of claim 3, wherein the control module operates the output arrangement to output a crying sound at the commencement of each of the infant activities.

5. The infant simulation system of claim 1, wherein each infant activity has a predetermined duration.

6. The infant simulation system of claim 1, wherein the control module is operable in response to the response arrangement to operate the output arrangement so as to output a cooing sound when the response arrangement terminates the infant activity.

7. A method of operating an infant simulation device including a mannequin having an operating arrangement and an output, comprising the steps of:
   providing the operating arrangement with a plurality of programs, each of which corresponds to a predetermined schedule of one or more simulated infant activities;
   selecting at least one of the programs; and
   operating the device according to the selected one of the programs to simulate infant activities according to the predetermined schedule of the selected program, and to terminate the one or more infant activities separately from the operating arrangement without terminating subsequent infant activities.

8. The method of claim 7, wherein the control arrangement includes a control module having a plurality of switches, and wherein the step of selecting at least one of the programs is carried out by actuating the switches in one of a plurality of configurations, each of which corresponds to one of the programs.

9. An infant simulation system, comprising:
   a mannequin;
   a control module associated with the mannequin and including an output arrangement for simulating one or more infant activities;
   a response arrangement operatively interconnected with the control module for terminating the one or more infant activities; and
   a selectively actuable override arrangement associated with the control module for terminating the one or more infant activities separately from the response arrangement.

10. The infant simulation system of claim 9, wherein the response arrangement comprises a plurality of similarly configured response members, each of which is selectively engageable with the control module and is operable to terminate one of the infant activities, and wherein the override arrangement comprises an override actuator member configured similarly to the response members and engageable with the control module, wherein the override actuator member is operable to terminate all of the infant activities.

11. The infant simulation system of claim 9, wherein the control module is operable to provide an output indicative of actuation of the override arrangement.

12. A method of operating an infant simulation device including a mannequin having a control arrangement and an output, comprising the steps of:

operating the control arrangement to intermittently simulate one or more infant activities;

normally terminating the one or more infant activities by operation of one or more response elements, each of which corresponds to one of the infant activities; and selectively terminating the one or more infant activities by operation of an override arrangement which interacts with the control arrangement to terminate the selected one or more infant activities occurring at the time of override without terminating subsequent infant activities.

13. The method of claim 12, wherein the one or more response elements comprise a plurality of similarly configured response members, each of which is engageable with the control arrangement and is operable to terminate one of the infant activities, and wherein the override arrangement comprises an override actuator member configured similarly to the response members and engageable with the control arrangement.

14. The method of claim 12, further comprising the step of providing an output signal in response to operation of the override arrangement.

* * * * *

UNITED STATES PATENT AND TRADEMARK OFFICE
CERTIFICATE OF CORRECTION

PATENT NO. : 6,699,045 B2 Page 1 of 1
DATED : March 2, 2004
INVENTOR(S) : Daniel C. Christianson et al.

It is certified that error appears in the above-identified patent and that said Letters Patent is hereby corrected as shown below:

Column 12,
Line 63, after "arrangement" insert -- without terminating subsequent infant activities --.

Signed and Sealed this

Twenty-second Day of March, 2005

JON W. DUDAS
*Director of the United States Patent and Trademark Office*